July 23, 1963 — DE LACY F. FERRIS — 3,098,544
DEFORMABLE SHOCK ABSORBER
Filed June 28, 1962

INVENTOR
DeLacy F. Ferris

BY *Claude Funkhouser*
ATTORNEY

ས3,098,544
DEFORMABLE SHOCK ABSORBER
De Lacy F. Ferris, Mine Hill, Dover, N.J., assignor, by mesne assignments, to the United States of America as represented by the Secretary of the Navy
Filed June 28, 1962, Ser. No. 206,560
3 Claims. (Cl. 188—1)

This invention relates to a device for arresting the motion of a moving body and more particularly to a new and improved annular shock absorber.

More specifically, the invention provides a shock absorber for arresting, with a minimum shock, the motion of a moving body such, for example, as the shear slide used to initiate the flow of propellants in a packaged liquid rocket engine. The shock absorber comprises an annulus composed of any metallic material suitable for the purpose. The annulus has a uniform thickness throughout the length thereof and is provided with a rigid straight portion parallel to the centerline of the annulus and an angular portion disposed at a predetermined angle with respect to the centerline of the annulus.

An object of the invention is to provide a new and improved shock absorber for arresting the motion of a moving body with a minimum of shock, by absorbing the energy of motion by deforming.

Another object of the invention is to provide an annular shock absorber which will deform uniformly and will present a constant force against the body producing the deformation.

Still another object of the invention is to provide a deformable shock absorber which reduces the high initial load required to deform a short column by presenting a conical portion which functions as a spring until actual deformation takes place.

A still further object of the present invention is to provide a semi-conical, non-reusable, deformable shock absorber composed of any metallic material suitable for the purpose which is designed to arrest the motion of a moving body with a minimum of shock by absorbing the energy of motion by deforming.

Other objects and many of the attendant advantages of this invention will be readily appreciated as the same becomes better understood by reference to the following detailed description when considered in connection with the accompanying drawings wherein.

Figure 1:
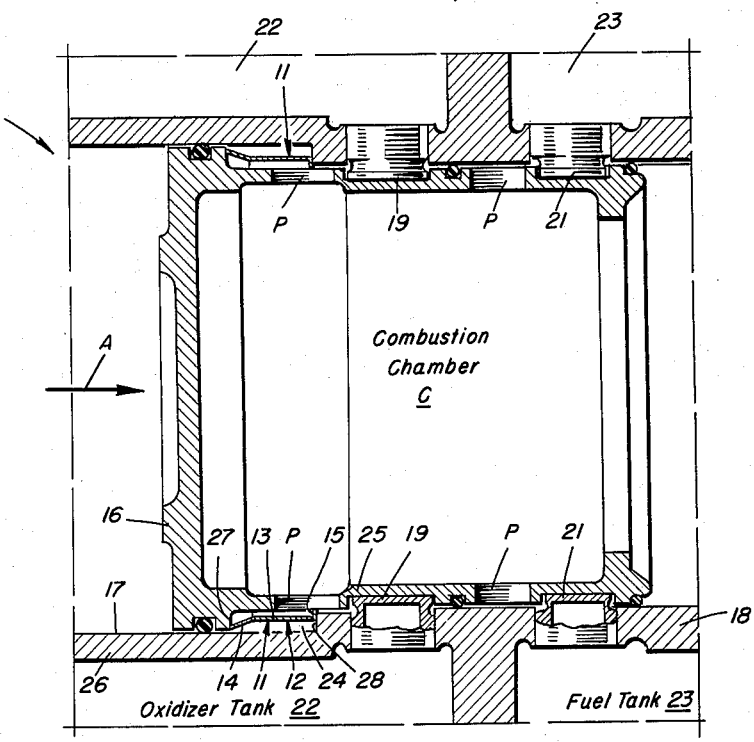
FIG. 1 is a fragmentary sectional view illustrating the shock absorber in connection with a conventional initiating unit.
Figure 2:
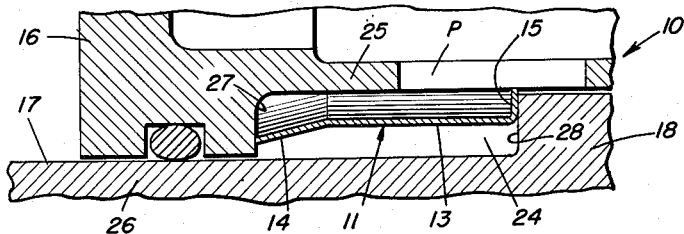
FIG. 2 is an enlarged sectional view of the shock absorber and a fragmentary portion of the initiator unit.
Figure 3:
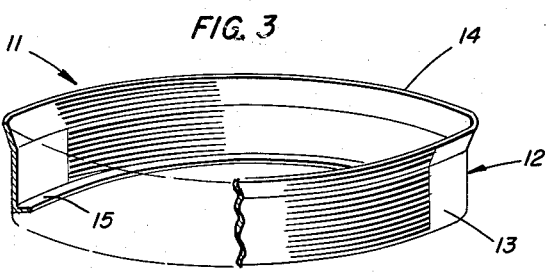
FIG. 3 is a view in perspective of the shock absorber of FIGS. 1 and 2.

Referring now to the drawing and more particularly to FIG. 1, there is shown a conventional initiator unit indicated generally by the numeral 10, which unit is one of the various types of devices wherein the shock absorber 11 of the present invention may be employed. The shock absorber 11 comprises a deformable annulus 12, the wall thickness of which is uniform throughout the length thereof. The annulus further includes a rigid straight portion 13 parallel to the centerline of the annulus, an angular or flared portion 14 extending outwardly from the straight portion 13 at one end at a predetermined angle with respect to the centerline of the annulus, and an inwardly extending flange portion 15 at the other end of the straight portion and at a right angle with respect thereto and the centerline of the annulus.

With reference to FIG. 1, it will be noted that the unit 10 comprises a shear slide or piston 16 slidably arranged within a bore 17 formed in a fixed member or center header 18, the shear slide being pressure operated, which pressure forcibly moves the slide in a direction, as indicated by arrow A. This movement of the slide is adapted to shear the caps 19 and 21 and thus establish fluid communication between the oxidizer and fuel tanks 22—23 in the header 18 and the combustion chamber C in slide 16 by way of ports P thereby to initiate the flow of propellants into the packaged liquid rocket engines. It is to be understood that upon shearing of the caps the ports P in the shear slide 16 move into registration with openings produced by the shearing of the caps and thus fluid communication between the tanks and chamber is established.

It will be noted, FIG. 1, that in use the shock absorber 11 is disposed in a recess 24 formed between the wall 25 of the slide 16 and the wall 26 of the header 18 with the end of the conical or flared portion 14 in engagement with a shoulder 27 formed on the slide 16, the straight portion 13 being disposed substantially midway between the walls 25 and 26 and the inwardly extending flange 15 in engagement with a shoulder 28 formed on the fixed header 18. Thus, during a shearing operation such, for example, as when the slide is forcibly moved in the aforesaid manner, the shock absorber will deform uniformly and will present a constant force against the slide or other body, as the case may be, producing the deformation. Moreover, by the specific structure and arrangement, the shock absorber of the present invention advantageously reduces the high initial load required to deform a short column by presenting a conical portion which functions as a spring until actual deformation takes place.

From the foregoing it will be apparent that a novel semi-conical shock absorber has been constructed and arranged to arrest the motion of a moving body with a minimum of shock by absorbing the energy of motion by deforming, to deform uniformly and present a constant force against the body producing the deformation and which has the advantage of reducing the high initial load required to deform a short column by presenting a conical section which functions as a spring until actual deformation occurs.

Obviously, many modifications and variations of the present invention are possible in the light of the above teachings. It is, therefore, to be understood that within the scope of the appended claims the invention may be practiced otherwise than as specifically described.

What is claimed is:

1. In a deformable shock absorber the combination of a cylinder, a pressure responsive slide movably mounted within the cylinder, means for arresting the motion of the slide with a minimum of shock by absorbing the energy of motion by deforming upon movement of the slide with respect to the cylinder, said means including an annulus disposed between the cylinder and the slide in abutting engagement therewith, a rigid annular straight wall on the annulus, an annular angularly disposed flange at one end of said straight wall, and an inwardly extending flange at the other end of the straight wall, said inwardly disposed flange being in engagement with said cylinder and said angularly disposed flange being in engagement with said pressure responsive slide.

2. In a deformable shock absorber the combination of a fixed header having a cylindrical bore therein, a pressure responsive piston slidable within said bore, an annulus disposed between the header and the piston and deformed uniformly upon movement of the piston with respect to the header thereby to present a constant force against the piston, an annular straight wall formed on the annulus, and disposed in said bore in spaced relationship with respect to the head and the piston, a flared annular wall formed on the straight wall at one end thereof in engagement with the piston, and an annular flange formed on the other end of the straight wall in engagement with the header.

3. In a deformable shock absorber the combination of a fixed member having a cylindrical bore therein and a shoulder thereon, a pressure responsive piston slidable within the bore and having a shoulder thereon cooperating with the shoulder on the member, an annulus disposed between the shoulders in abutting engagement therewith and deformed uniformly upon movement of the piston with respect to the member, a straight annular wall on the annulus and disposed between and in mutually spaced relation with respect to the fixed member and the pressure responsive piston, an annular outwardly flared flange formed on the straight wall at one end thereof in engagement with the shoulder on the piston, and an inwardly extending flange formed on the straight wall at the other end thereof in engagement with the shoulder on the member.

References Cited in the file of this patent
UNITED STATES PATENTS

| | | |
|---|---|---|
| 874,150 | Young | Dec. 17, 1907 |
| 2,457,205 | Campbell et al. | Dec. 28, 1948 |
| 2,870,871 | Stevinson | Jan. 27, 1959 |
| 2,966,200 | Fredhold | Dec. 27, 1960 |